US012176657B2

(12) United States Patent
Chen et al.

(10) Patent No.: US 12,176,657 B2
(45) Date of Patent: Dec. 24, 2024

(54) CONNECTOR AND ELECTRONIC DEVICE TO REDUCE SIGNAL CROSSTALK PHENOMENA AND OPTIMIZE SIGNAL TRANSMISSION PERFORMANCE

(71) Applicant: HUAWEI TECHNOLOGIES CO., LTD., Shenzhen (CN)

(72) Inventors: Jun Chen, Dongguan (CN); Zhengyan Ou, Shenzhen (CN); Shuang Qiu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 17/749,693

(22) Filed: May 20, 2022

(65) Prior Publication Data

US 2022/0278490 A1 Sep. 1, 2022

Related U.S. Application Data

(63) Continuation of application No. PCT/CN2020/089058, filed on May 7, 2020.

(30) Foreign Application Priority Data

Nov. 22, 2019 (CN) ........................ 201922037802.0

(51) Int. Cl.

*H01R 13/6582* (2011.01)
*H01R 13/6461* (2011.01)
*H01R 13/6586* (2011.01)

(52) U.S. Cl.

CPC ..... *H01R 13/6582* (2013.01); *H01R 13/6461* (2013.01); *H01R 13/6586* (2013.01)

(58) Field of Classification Search

CPC ............ H01R 13/6461; H01R 13/6582; H01R 13/6586

See application file for complete search history.

(56) References Cited

U.S. PATENT DOCUMENTS 5,993,259 A * 11/1999 Stokoe ............... H01R 13/6476 439/607.09
6,347,962 B1 2/2002 Kline
(Continued)

FOREIGN PATENT DOCUMENTS

CN 107994405 A 5/2018
CN 108963667 A 12/2018
(Continued)

*Primary Examiner* — Oscar C Jimenez
(74) *Attorney, Agent, or Firm* — Rimon PC

(57) ABSTRACT

This application provides a connector and an electronic device, to reduce signal crosstalk phenomena and optimize signal transmission performance of the connector. The connector includes a base, a plurality of terminal modules disposed on the base, and a ground shielding plate. The plurality of terminal modules are disposed in parallel in a first direction, and the ground shielding plate is disposed between two adjacent terminal modules. The ground shielding plate includes a body and at least two elastic elements disposed on the body, each elastic element includes a first spring arm, a second spring arm, and a contact part, a first end of the first spring arm and a first end of the second spring arm are separately connected to the body, and a second end of the first spring arm and a second end of the second spring arm are separately connected to the contact part.

18 Claims, 5 Drawing Sheets

(56) References Cited

U.S. PATENT DOCUMENTS

| | | | | |
|---|---|---|---|---|
| 6,899,566 | B2 * | 5/2005 | Kline ................. | H01R 13/6587 439/607.06 |
| 9,225,085 | B2 * | 12/2015 | Cartier, Jr. ........... | H05K 1/0251 |
| 9,831,608 | B1 | 11/2017 | Pickel et al. | |
| 9,941,641 | B1 | 4/2018 | Jiang et al. | |
| 2003/0186594 | A1 * | 10/2003 | Davis ................. | H01R 13/6586 439/701 |

FOREIGN PATENT DOCUMENTS

| | | | |
|---|---|---|---|
| CN | 109217031 | A | 1/2019 |
| CN | 110098539 | A | 8/2019 |
| JP | 2009170308 | A | 7/2009 |

* cited by examiner

CONNECTOR AND ELECTRONIC DEVICE TO REDUCE SIGNAL CROSSTALK PHENOMENA AND OPTIMIZE SIGNAL TRANSMISSION PERFORMANCE

CROSS-REFERENCE TO RELATED APPLICATIONS

This application is a continuation of International Application No. PCT/CN2020/089058, filed on May 7, 2020, which claims priority to Chinese Patent Application No. 201922037802.0, filed on Nov. 22, 2019. The disclosures of the aforementioned applications are hereby incorporated by reference in their entireties.

TECHNICAL FIELD

This application relates to the field of electronic device technologies, and in particular, to a connector and an electronic device.

BACKGROUND

High-speed connectors are widely applied to information and communications technologies, and are connectors commonly used in large communications devices, ultra-high-performance servers, super computers, industrial computers, and high-end storage devices. Main functions of the high-speed connector are to connect a board and a backplane and transmit a high-speed differential signal or a high-speed single-ended signal and a high current between the board and the backplane. With continuous improvement of communications technologies, requirements for a transmission rate and transmission quality of data also become higher. Currently, for an existing high-speed connector, because of a structure limitation of a ground shielding plate, signal crosstalk is relatively serious, affecting a transmission rate and transmission quality of data.

SUMMARY

This application provides a connector and an electronic device, to reduce signal crosstalk phenomena and optimize signal transmission performance of the connector.

According to a first aspect, this application provides a connector. The connector includes a base, a plurality of terminal modules, and a ground shielding plate. The plurality of terminal modules are disposed on the base in parallel in a first direction, and may be configured to transmit high-speed differential signals or high-speed single-ended signals and high currents. The ground shielding plate is disposed between two adjacent terminal modules to shield an interfering signal for a corresponding terminal module. During specific disposition, the ground shielding plate includes a body and at least two elastic elements disposed on the body. Each elastic element includes a first spring arm, a second spring arm, and a contact part. A first end of the first spring arm and a first end of the second spring arm are separately connected to the body, and a second end of the first spring arm and a second end of the second spring arm are separately connected to the contact part. During disposition, the contact part is biased toward the first direction relative to the body, so that when the connector and a mated connector are plug-connected to each other, the contact part can elastically abut against a ground shielding plate of the mated connector, thereby ensuring electrical connection reliability of the contact part and the ground shielding plate of the mated connector.

In some embodiments, after the contact part is electrically connected to the ground shielding plate of the mated connector, the first spring arm and the second spring arm can form two signal return paths connecting the contact part and the body. At least two elastic elements may be disposed on each ground shielding plate. In this case, at least four signal return paths can be formed between the ground shielding plate of the connector in an embodiment of this application and the ground shielding plate of the mated connector, so that loop inductance can be reduced, resonance phenomena of signal crosstalk phenomena can be reduced, and signal transmission performance of the connector can be optimized.

When the first spring arm and the second spring arm are disposed, the first spring arm is tilted toward the first direction relative to the body, and the second spring arm is tilted toward the first direction relative to the body. In this case, when the contact part is formed, the contact part is separately connected to the second end of the first spring arm and the second end of the second spring arm, so that the contact part can be easily biased toward the first direction.

In a specific implementation solution, the connector and the mated connector may be plug-connected to each other in a second direction. In this case, the at least two elastic elements may be disposed on the body in the second direction. When the connector in an embodiment of this application and the mated connector are plug-connected to each other in the second direction, a length of an electric stub generated at an end of the ground shielding plate of the mated connector can be reduced, so that resonance phenomena of signal crosstalk phenomena are further reduced, and signal transmission performance of the connector is optimized.

When the contact part is formed, the second end of the first spring arm intersects with the second end of the second spring arm, and the contact part is disposed at an intersection location between the second end of the first spring arm and the second end of the second spring arm.

In a specific implementation solution, when the connector and the mated connector are plug-connected to each other in the second direction, in the second direction, one end of the ground shielding plate is connected to the base, and a first protrusion protruding in the first direction is disposed at the other end. In this solution, when the connector in an embodiment of this application and the mated connector are plug-connected to each other, the ground shielding plate of the mated connector can be kept at a specific spacing from the ground shielding plate by using the first protrusion, to prevent the ground shielding plate of the mated connector from being inserted into a slot between the elastic element and the body.

In another specific implementation solution, a second protrusion is disposed at the intersection location between the second end of the first spring arm and the second end of the second spring arm, the second protrusion protrudes in the first direction, and the top of the second protrusion forms the contact part. The contact part is formed by using the top of the second protrusion, so that contact reliability of the ground shielding plate and the ground shielding plate of the mated connector can be improved.

During specific disposition, a surface of the second protrusion may be circular, arc-shaped, arch-shaped, or the like, to guide movement of the ground shielding plate of the mated connector, so that a plug-connection process of the mated connector is smoother.

In another specific implementation solution, the elastic element further includes a third spring arm, the third spring arm is separately connected to the second end of the first spring arm and the second end of the second spring arm, a third protrusion protruding in the first direction is disposed on the third spring arm, and the top of the third protrusion forms the contact part. The contact part is formed by using the top of the third protrusion, so that contact reliability of the ground shielding plate and the ground shielding plate of the mated connector can be improved.

Similarly, a surface of the third protrusion may also be circular, arc-shaped, arch-shaped, or the like, to guide movement of the ground shielding plate of the mated connector, so that a plug-connection process of the mated connector is smoother.

In a specific implementation solution, a notch is disposed on the body, and the at least two elastic elements are disposed in the notch.

In a specific implementation solution, an opening is formed at the first end of the first spring arm and the first end of the second spring arm. When a notch is provided on the body, a direction of an opening of one of two adjacent elastic elements is opposite to that of an opening of the other elastic element, so that a cross-sectional area of the notch provided on the body can be reduced, and structural reliability of the ground shielding plate can be improved.

According to a second aspect, this application further provides an electronic device. The electronic device includes the connector in any one of the foregoing possible implementation solutions of the first aspect, and the connector may be configured to transmit a signal between a circuit board of the electronic device and another function module, to reduce signal crosstalk phenomena and optimize signal transmission performance.

DESCRIPTION OF EMBODIMENTS

To make the objectives, technical solutions, and advantages of this application clearer, the following further describes this application in detail with reference to the accompanying drawings.

Figure 1:
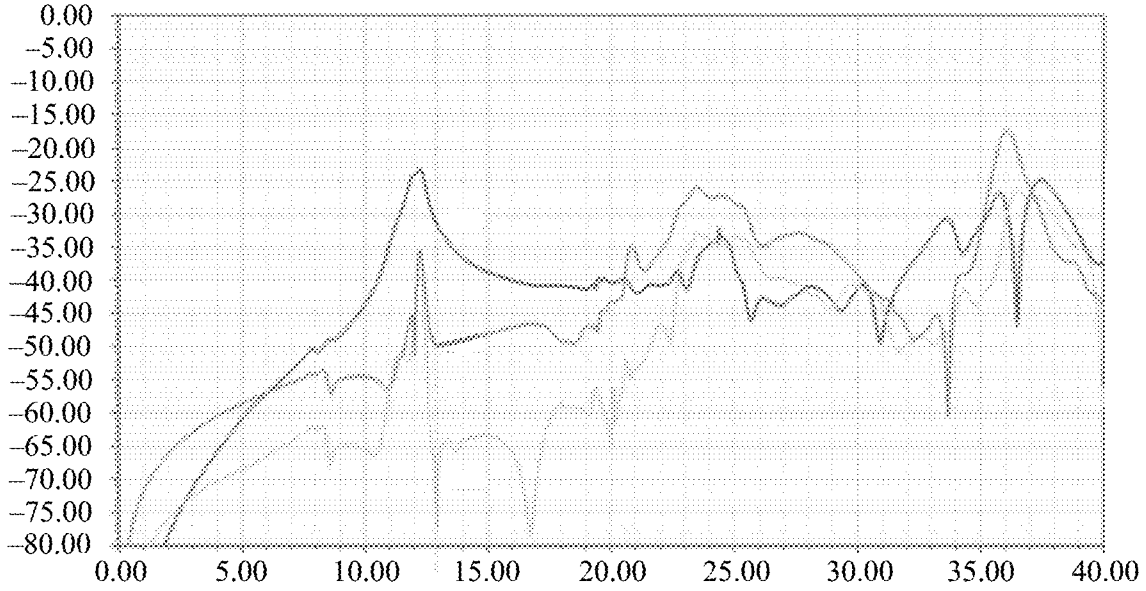
FIG. 1 is a line graph of crosstalk of a connector according to the conventional technology.

To facilitate understanding of a connector provided in embodiments of this application, the following first describes an application scenario of the connector. The connector may be applied to an electronic device, and is configured to transmit a high-speed differential signal or a high-speed single-ended signal and a high current. The electronic device may be a device such as a communications device, a server, a super computer, a router, or a switch in the conventional technology. With continuous improvement of communications technologies, requirements for a transmission rate and transmission quality of data also become higher, and therefore signal crosstalk needs to be further reduced. In the conventional technology, only a single-point contact connection is usually implemented between ground shielding plates of two cooperating connectors by using a single spring arm. Consequently, a signal return path is relatively sensitive, and high-frequency signal resonance is prone to occur. FIG. 1 is a line graph of crosstalk of a connector according to the conventional technology. It can be learned that resonance occurs on near-end crosstalk and far-end crosstalk at 14 GHz, and a resonance peak value can reach −23 dB, seriously affecting a signal transmission capability of the connector and preventing a further increase in a transmission rate of the connector. Based on this, an embodiment of this application provides a connector. A ground shielding plate of the connector has at least two contact parts and at least four spring arms. Therefore, when the connector and a mated connector are plug-connected to each other, the ground shielding plate of the connector and a ground shielding plate of the mated connector can be electrically connected at at least two locations, and at least four signal return paths are generated, so that loop inductance can be reduced, signal crosstalk phenomena can be reduced, and signal transmission performance of the connector can be optimized.

Figure 2:
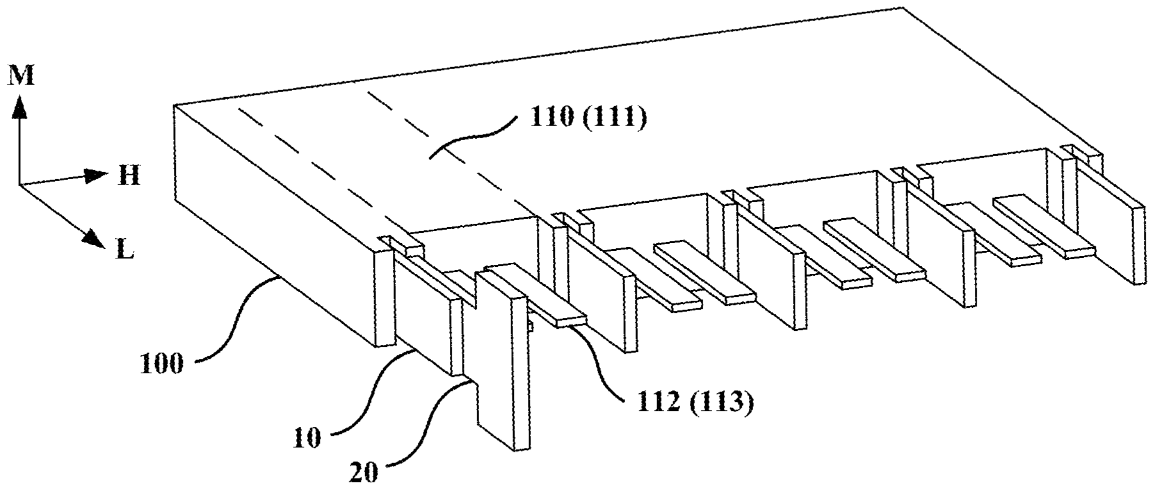
FIG. 2 is a schematic diagram of a structure of a connector according to an embodiment of this application.

Refer to FIG. 2. The connector provided in an embodiment of this application includes a base 100 and a plurality of terminal modules 110. The plurality of terminal modules 110 are disposed on the base 100 in parallel in a first direction (namely, a direction H). Each terminal module 110 includes an insulator 111 and a plurality of signal terminals 112 penetrating the insulator. These signal terminals 112 may be single-ended signal terminals or may be differential signal terminals disposed in pairs. Two ends of the signal terminal 112 separately protrude from two end surfaces of the insulator 111, to implement a connection to a circuit board and a mated connector. During specific disposition, one end of the signal terminal 112 protrudes from a first end face of the insulator 111, a first connection terminal (not shown in the figure) configured to electrically connect to the circuit board is disposed at the end, the other end of the signal terminal 112 protrudes from a second end face of the insulator 111, and second connection terminals 113 configured to electrically connect to terminal modules of the mated connector are disposed at the end.

It should be noted that in some embodiments, the terminal modules 110 may be alternatively disposed on the base 100 in parallel in a direction M. In this case, the first direction is the direction M. Alternatively, in other embodiments, a plurality of terminal modules 110 may be disposed on the base 100 in parallel in both the direction M and the direction H. This is not limited in this application.

In some embodiments, the connector further includes a plurality of ground shielding plates 10. The plurality of ground shielding plates 10 are also disposed on the base 100, and each ground shielding plate 10 is located between second connection terminals 113 of two adjacent terminal modules 110, to shield interfering signals such as electromagnetic or radio frequency signals for the plurality of terminal modules 110. Specifically, when the connector in an embodiment of this application and the mated connector are plug-connected to each other in a second direction (namely, a direction L) perpendicular to the first direction, the terminal modules of the mated connector and the terminal modules of the connector in an embodiment of this application are correspondingly plug-connected to each other, and a ground shielding plate 20 of the mated connector is located on a side on which a corresponding ground shielding plate 10 in an embodiment of this application faces the first direction. In other words, after the mated connector and the connector in an embodiment of this application are plug-connected to each other, the ground shielding plates of the two connectors are in a stacked and connected state.

Figure 3:
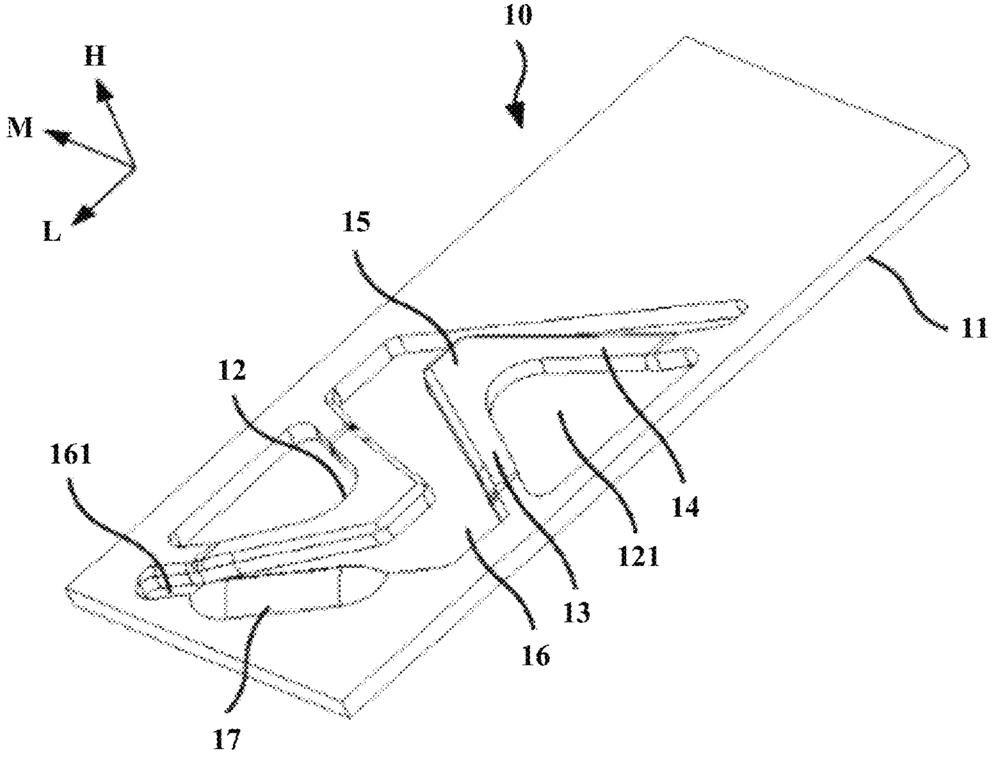
FIG. 3 is a schematic diagram of a structure of a ground shielding plate according to an embodiment of this application.
Figure 4:
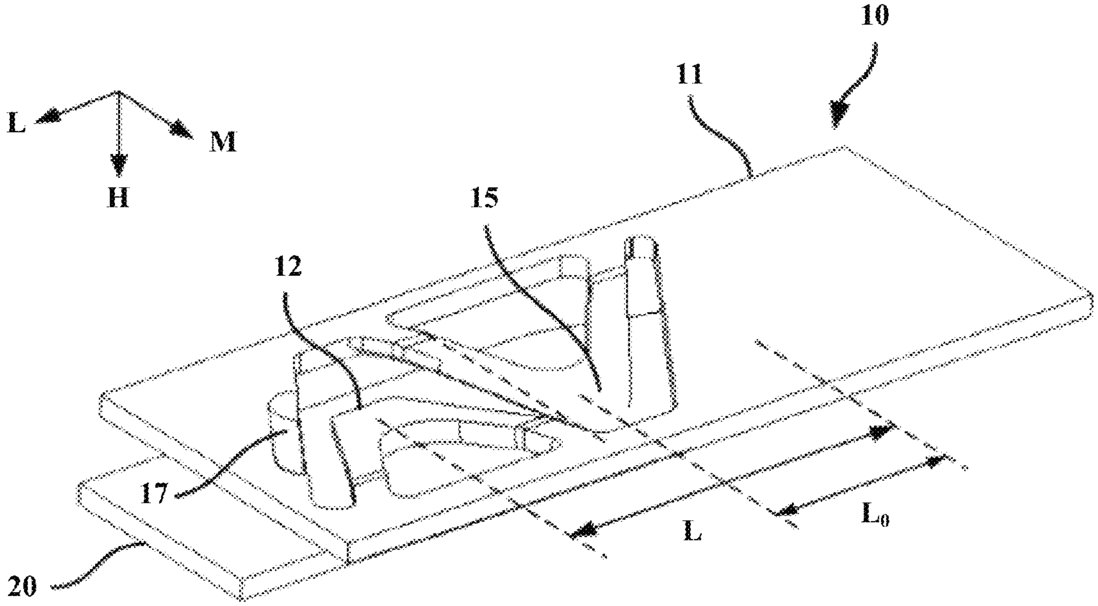
FIG. 4 is a schematic diagram of a connection status between the ground shielding plate in FIG. 3 and a ground shielding plate of a mated connector.

When the ground shielding plate is specifically disposed, refer to FIG. 3 and FIG. 4. The ground shielding plate 10 includes a body 11 and an elastic element 12 disposed on the body 11, and the elastic element 12 includes a first spring arm 13, a second spring arm 14, and a contact part 15. A first end of the first spring arm 13 and a first end of the second spring arm 14 are separately connected to the body 11, a second end of the first spring arm 13 and a second end of the second spring arm 14 are separately connected to the contact part 15, and the contact part 15 is a part that is on the ground shielding plate 10 and that is electrically connected to the ground shielding plate 20 of the mated connector. During disposition, the contact part 15 is biased toward the first direction (namely, the direction H) relative to the body 11, so that when the connector and the mated connector are plug-connected to each other in the second direction (namely, the direction L), the contact part 15 can elastically abut against the ground shielding plate 20 of the mated connector, thereby ensuring electrical connection reliability of the contact part 15 and the ground shielding plate 20 of the mated connector.

Further refer to FIG. 3 and FIG. 4. After the contact part 15 is electrically connected to the ground shielding plate 20 of the mated connector, the first spring arm 13 and the second spring arm 14 can form two signal return paths connecting the contact part 15 and the body 11. In this embodiment of this application, at least two elastic elements 12 may be disposed on each ground shielding plate 10. In this case, at least four signal return paths can be formed between the ground shielding plate of the connector in this embodiment of this application and the ground shielding plate 20 of the mated connector. In this way, grounding paths can be increased, and more even grounding distribution can be provided. In addition, loop inductance can be reduced, resonance phenomena of crosstalk signals can be reduced, and signal transmission performance of the connector can be optimized.

Refer to FIG. 3. A notch 16 is disposed on the body 11 of the ground shielding plate 10. When the elastic element 12 is disposed, the elastic element 12 may be disposed in the notch 16. In addition, refer to FIG. 3 and FIG. 4. The at least two elastic elements 12 may be specifically disposed in the notch 16 in the second direction. In this case, when the connector in an embodiment of this application and the mated connector are plug-connected to each other in the second direction, for the elastic element 12 that is on the ground shielding plate 10 and that is disposed away from the base, if a distance L between the contact part 15 (namely, a part that is on the ground shielding plate 10 and that first comes into contact with the ground shielding plate 20 of the mated connector) of the elastic element 12 and an end of the ground shielding plate 20 of the mated connector is a specified value, compared with a design in which only one elastic element 12 is disposed or a plurality of elastic elements 12 are disposed in another arrangement manner, the solution of an embodiment of this application can reduce a length $L_0$ of an electric stub generated at the end of the ground shielding plate 20 of the mated connector, to further reduce resonance phenomena of crosstalk signals and optimize signal transmission performance of the connector.

In some embodiments, when the first spring arm 13 and the second spring arm 14 are disposed, the first spring arm 13 and the second spring arm 14 may be separately tilted toward the first direction, in other words, the second end of the first spring arm 13 and the second end of the second spring arm 14 are also separately biased toward the first direction. In this case, when the contact part 15 is formed, the contact part 15 is separately connected to the second end of the first spring arm 13 and the second end of the second spring arm 14, so that the contact part 15 can be easily biased toward the first direction.

Refer to a schematic diagram, shown in FIG. 3, of a structure of the ground shielding plate 10 in an embodiment of this application. In these embodiment, an opening 121 is formed at the first end of the first spring arm 13 and the first end of the second spring arm 14, and the second end of the first spring arm 13 intersects with the second end of the second spring arm 14. In this case, the elastic element 12 is “V”-shaped, and the contact part 15 is disposed at an intersection location between the second end of the first spring arm 13 and the second end of the second spring arm 14. In these embodiments, a direction of an opening 121 of one of two adjacent elastic elements 12 is opposite to that of an opening 121 of the other elastic element 12. When the ground shielding plate 10 includes two elastic elements 12, the two elastic elements 12 may be disposed in the notch in the manner shown in FIG. 3. In this way, a cross-sectional area of the notch 16 provided on the body 11 can be reduced, and structural reliability of the ground shielding plate 10 can be improved.

It may be understood that in some embodiments, the two elastic elements may be alternatively disposed in the notch in a manner in which directions of openings are the same, or may be disposed in the notch in a manner in which there is a specific included angle between directions of openings. Details are not described herein.

In addition, it should be noted that FIG. 3 shows only an example of a structural form when the ground shielding plate 10 includes two elastic elements 12. In some embodiments, when there are more than two elastic elements 12, the plurality of elastic elements 12 whose openings 121 have opposite directions are staggered in the notch 16 in the manner shown in FIG. 3. Details are not described herein.

When the connector in an embodiment of this application and the mated connector are plug-connected to each other, refer to FIG. 2 and FIG. 4. If a spacing between the ground shielding plate 10 and the ground shielding plate 20 of the mated connector is excessively small, the ground shielding plate 20 of the mated connector may be inserted into a slot 161 between the elastic element 12 and the body because the spring arm is tilted. Consequently, a jam occurs, and the two connectors cannot be connected in place. Based on this, in some embodiments, a first protrusion 17 is further disposed at an end that is of the body 11 and that is away from the base, and the first protrusion 17 protrudes in the first direction. In this solution, when the connector in an embodiment of this application and the mated connector are plug-connected to each other, the ground shielding plate 20 of the mated connector comes into contact with the first protrusion 17 before coming into contact with the elastic element 12.

The first protrusion 17 can enable the ground shielding plate 20 of the mated connector to be kept at a specific spacing from the ground shielding plate 10. It may be understood that the spacing is a height of the first protrusion 17. A height value of the first protrusion 17 is properly designed, to prevent the ground shielding plate 20 of the mated connector from being inserted into the slot 161 between the elastic element 12 and the ground shielding plate, so that movement of the ground shielding plate 20 of the mated connector is guided, and therefore the connector in an embodiment of this application and the mated connector can be smoothly plug-connected to each other through cooperation.

A specific shape of the first protrusion 17 is not limited. For example, the first protrusion 17 may be designed as a strip structure shown in FIG. 3 and FIG. 4. In this case, the first protrusion 17 may be disposed along an edge of the notch 16 or an edge of the body 11. In addition, in an embodiment of this application, a surface of the first protrusion 17 may be further designed as an arc-shaped or a semicircular structure. In this case, when the connector in an embodiment of this application and the mated connector are plug-connected to each other, even if an initial spacing between the ground shielding plate 10 and the ground shielding plate 20 of the mated connector is less than the height of the first protrusion 17 and interference may occur between an end of the ground shielding plate 20 of the mated connector and the first protrusion 17, a guide function of the arc-shaped or semicircular surface of the first protrusion 17 can enable the end of the ground shielding plate 20 of the mated connector to be tilted toward a side away from the ground shielding plate 10, so that the entire ground shielding plate 20 of the mated connector is tilted toward the side away from the ground shielding plate 10, and therefore the connector in an embodiment of this application and the mated connector can be smoothly plug-connected to each other through cooperation.

When the height value of the first protrusion 17 is set, specifically, the height value of the first protrusion 17 may not be greater than a bias distance of the contact part 15 relative to the body 11. In this case, after the connector in this application and the mated connector are plug-connected in place, the contact part 15 can still elastically abut against the ground shielding plate 20 of the mated connector, so that connection reliability of the two connectors is improved.

Figure 5:
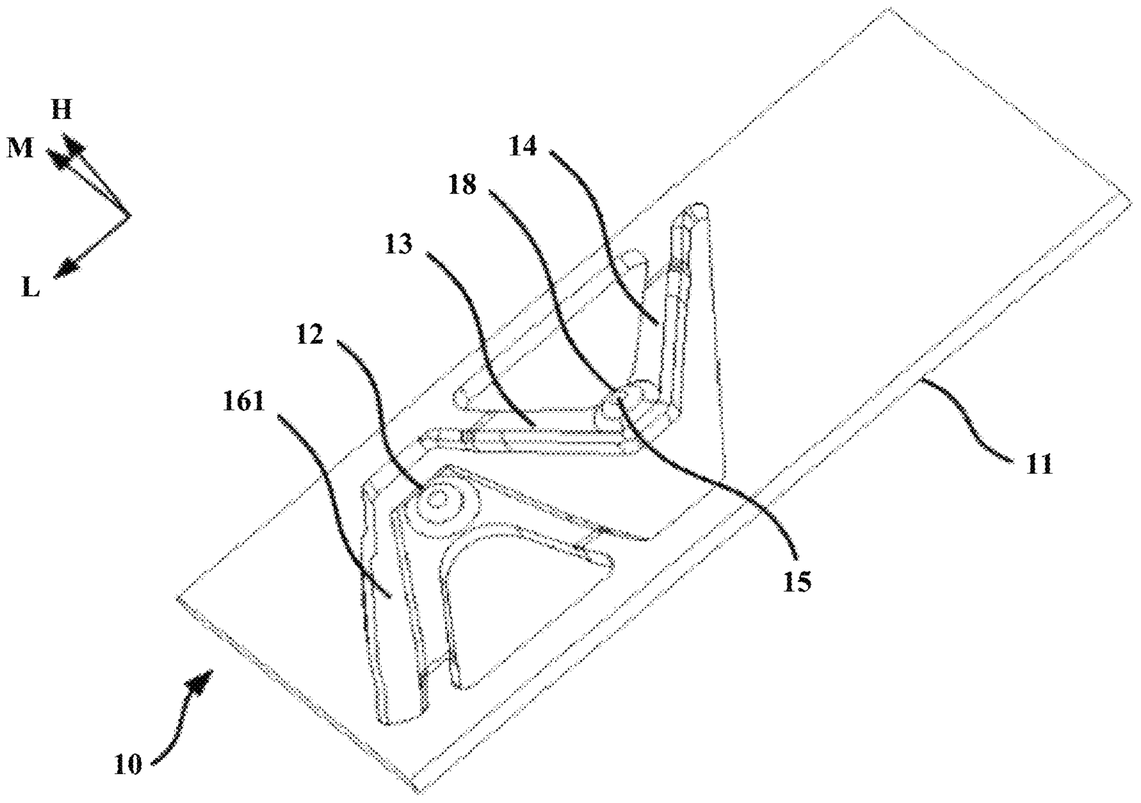
FIG. 5 is a schematic diagram of a structure of a ground shielding plate according to another embodiment of this application.

Refer to FIG. 5. In some embodiments, a second protrusion 18 is disposed at the intersection location between the second end of the first spring arm 13 and the second end of the second spring arm. Similarly, the second protrusion 18 also protrudes in the first direction. In this case, the top of the second protrusion 18 forms the contact part 15 in some embodiments. In these embodiments, when the first spring arm 13 and the second spring arm 14 are designed, a bias distance of the second end of the first spring arm 13/second spring arm 14 relative to the body 11 may be relatively small, so that the ground shielding plate of the mated connector is prevented from being inserted into the slot 161 between the elastic element 12 and the body. In addition, the second protrusion 18 is disposed at the intersection location between the second end of the first spring arm 13 and the second end of the second spring arm 14, and the contact part 15 is formed by using the top of the second protrusion 18, so that contact reliability of the ground shielding plate 10 and the ground shielding plate of the mated connector can be improved. In addition, when a surface of the second protrusion 18 is designed as a circular structure, an arc-shaped structure, an arch-shaped structure, or the like, movement of the ground shielding plate of the mated connector can be further guided, so that a plug-connection process of the mated connector is smoother.

Figure 6:
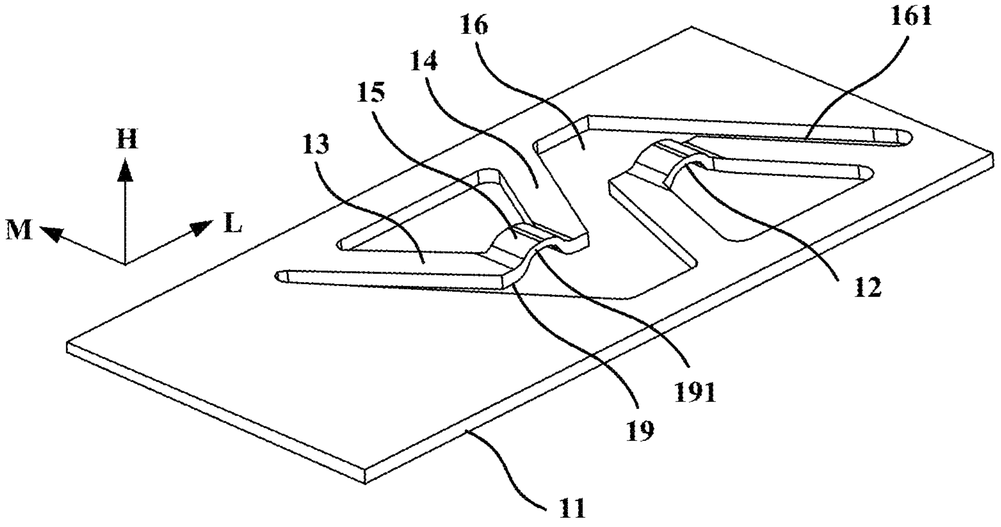
FIG. 6 is a schematic diagram of a structure of a ground shielding plate according to still another embodiment of this application.

FIG. 6 is a schematic diagram of a structure of a ground shielding plate according to other embodiments of this application. In these embodiments, the elastic element 12 further includes a third spring arm 19, the third spring arm 19 is connected between the second end of the first spring arm 13 and the second end of the second spring arm 14, and a third protrusion 191 protruding in the first direction is disposed on the third spring arm 19. In this case, the top of the third protrusion 191 forms the contact part 15 in these embodiments. Similarly, when the first spring arm 13 and the second spring arm 14 are designed, a bias distance of the second end of the first spring arm 13/second spring arm 14 relative to the body 11 may be relatively small, so that the ground shielding plate of the mated connector is prevented from being inserted into the slot 161 between the elastic element 12 and the edge of the notch 16. In some embodiments, the third protrusion 191 is disposed on the third spring arm 19, and the contact part 15 is formed by using the top of the third protrusion 191, so that contact reliability of the ground shielding plate 10 and the ground shielding plate of the mated connector can be further improved. In addition, when the third protrusion 191 is designed, a surface of the third protrusion 191 may also be designed as a circular structure, an arc-shaped structure, an arch-shaped structure, or the like, to guide movement of the ground shielding plate of the mated connector, so that a plug-connection process of the mated connector is smoother.

Figure 7:
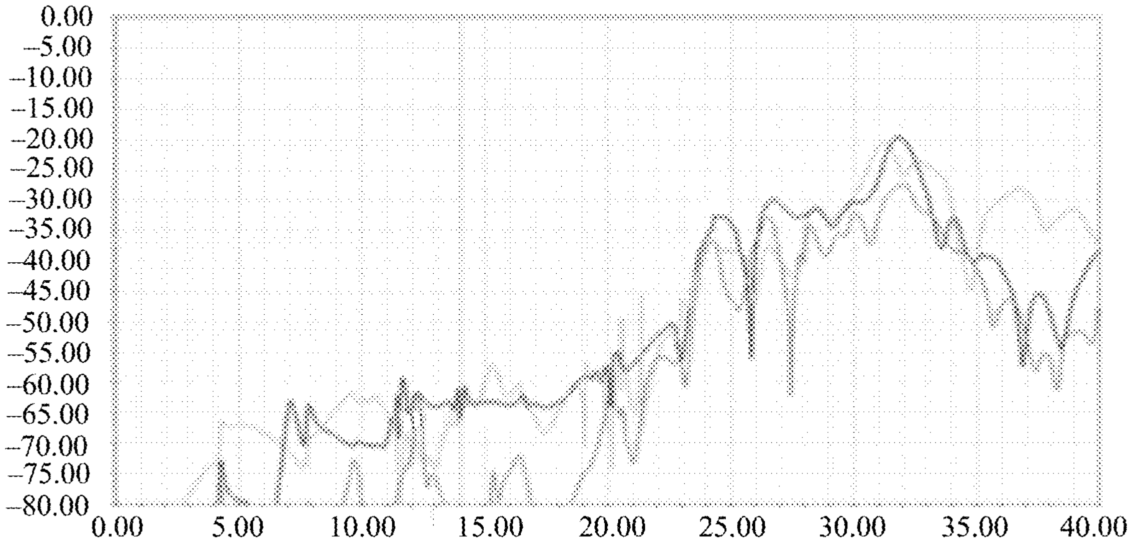
FIG. 7 is a line graph of crosstalk of a connector according to an embodiment of this application.

FIG. 7 is a line graph of crosstalk after the connector provided in embodiments of this application is used. It can be learned that in these embodiments, a ground shielding plate of the connector is electrically connected to a ground shielding plate of a mated connector at at least two locations, and at least four signal return paths are generated, so that loop inductance can be reduced, signal crosstalk phenomena can be reduced, and a crosstalk resonance frequency of the connector is increased from 14 GHz to 24 GHz, and therefore the connector can support data transmission at a rate of 56 Gbps or higher.

Embodiments of this application further provide an electronic device using the connector in the foregoing embodiment. The electronic device may be a device such as a communications device, a server, a super computer, a router, or a switch in the conventional technology. The connector provided in the foregoing embodiment may be configured to transmit a signal between a circuit board of the electronic device and another function module, to reduce signal crosstalk phenomena and optimize signal transmission performance.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A connector, comprising a base, a plurality of terminal modules disposed on the base, and a ground shielding plate, wherein:

the plurality of terminal modules are disposed in parallel in a first direction, and the ground shielding plate is disposed between two adjacent terminal modules; and the ground shielding plate comprises a body, a notch disposed on the body and at least two elastic elements disposed in the notch, wherein each elastic element is oppositely oriented to an adjacent elastic element, each elastic element comprises a first spring arm, a second spring arm, and a contact part, a first end of the first spring arm and a first end of the second spring arm are separately connected to the body, and a second end of the first spring arm and a second end of the second spring arm are separately connected to the contact part; and the contact part is biased toward the first direction relative to the body, and is configured to electrically connect to a ground shielding plate of a mated connector.

2. The connector according to claim 1, wherein the first spring arm is tilted toward the first direction relative to the body, and the second spring arm is tilted toward the first direction relative to the body.

3. The connector according to claim 1, wherein the connector and the mated connector are plug-connected to each other in a second direction, and the at least two elastic elements are disposed on the body in the second direction.

4. The connector according to claim 1, wherein the second end of the first spring arm intersects with the second end of the second spring arm, and the contact part is disposed at an intersection location between the second end of the first spring arm and the second end of the second spring arm.

5. The connector according to claim 4, wherein when the connector and the mated connector are plug-connected to each other in a second direction, one end of the ground shielding plate is connected to the base in the second direction, and a first protrusion protruding in the first direction is disposed at the other end.

6. The connector according to claim 5, wherein a height of the first protrusion is not greater than a bias distance of the contact part relative to the body.

7. The connector according to claim 4, wherein a second protrusion is disposed at the intersection location between the second end of the first spring arm and the second end of the second spring arm, the second protrusion protrudes in the first direction, and the top of the second protrusion forms the contact part.

8. The connector according to claim 1, wherein each elastic element further comprises a third spring arm separately connected to the second end of the first spring arm and the second end of the second spring arm, and a third protrusion protruding in the first direction and is disposed on the third spring arm, wherein a top of the third protrusion forms the contact part.

9. The connector according to claim 1, wherein an opening is formed at the first end of the first spring arm and the first end of the second spring arm; and a direction of an opening of one of two adjacent elastic elements is opposite to that of an opening of the other elastic element.

10. An electronic device, comprising the connector according to claim 1.

11. The electronic device of claim 10, wherein the first spring arm is tilted toward the first direction relative to the body, and the second spring arm is tilted toward the first direction relative to the body.

12. The electronic device of claim 10, wherein the connector and the mated connector are plug-connected to each other in a second direction, and the at least two elastic elements are disposed on the body in the second direction.

13. The electronic device of claim 10, wherein the second end of the first spring arm intersects with the second end of the second spring arm, and the contact part is disposed at an intersection location between the second end of the first spring arm and the second end of the second spring arm.

14. The electronic device of claim 13, wherein when the connector and the mated connector are plug-connected to each other in a second direction, one end of the ground shielding plate is connected to the base in the second direction, and a first protrusion protruding in the first direction is disposed at the other end.

15. The electronic device of claim 14, wherein a height of the first protrusion is not greater than a bias distance of the contact part relative to the body.

16. The electronic device of claim 13, wherein a second protrusion is disposed at the intersection location between the second end of the first spring arm and the second end of the second spring arm, the second protrusion protrudes in the first direction, and the top of the second protrusion forms the contact part.

17. The electronic device of claim 10, wherein each elastic element further comprises a third spring arm separately connected to the second end of the first spring arm and the second end of the second spring arm, and a third protrusion protruding in the first direction and is disposed on the third spring arm, wherein a top of the third protrusion forms the contact part.

18. The electronic device of claim 10, wherein an opening is formed at the first end of the first spring arm and the first end of the second spring arm; and a direction of an opening of one of two adjacent elastic elements is opposite to that of an opening of the other elastic element.

* * * * *